(12) United States Patent
Madsen et al.

(10) Patent No.: US 8,234,047 B2
(45) Date of Patent: Jul. 31, 2012

(54) TRANSFERRING DEVICE AND AN AGRICULTURAL VEHICLE

(75) Inventors: Tommy Ertbolle Madsen, Virum (DK); Morten Rufus Blas, Copenhagen (DK); Allan Kildeby, Esperade (DK); Kristian Kirk, Helsingør (DK)

(73) Assignee: CLAAS Agrarsystems GmbH & Co. KG, Guetersloh (DE)

( * ) Notice: Subject to any disclaimer, the term of this patent is extended or adjusted under 35 U.S.C. 154(b) by 318 days.

(21) Appl. No.: 12/488,687

(22) Filed: Jun. 22, 2009

(65) Prior Publication Data
US 2010/0063692 A1    Mar. 11, 2010

(30) Foreign Application Priority Data
Jun. 25, 2008    (DK) .................................. 2008 00873

(51) Int. Cl.
| A01D 41/14 | (2006.01) |
| G06F 7/70 | (2006.01) |
| G06F 19/00 | (2006.01) |
| G06G 7/00 | (2006.01) |
| G06G 7/76 | (2006.01) |

(52) U.S. Cl. .................... 701/50; 56/10.2 R; 56/DIG. 15
(58) Field of Classification Search .................... 701/50; 172/2–4, 4.5, 5, 7; 37/348; 342/22; 414/694; 73/866.5; 56/10.2 R, DIG. 15
See application file for complete search history.

(56) References Cited

U.S. PATENT DOCUMENTS
6,247,538 B1    6/2001    Takeda et al.

FOREIGN PATENT DOCUMENTS
| DE | 44 26 059 | 2/1996 |
| EP | 1 344 445 | 9/2003 |

*Primary Examiner* — Christopher J. Novosad
(74) *Attorney, Agent, or Firm* — Michael J. Striker

(57) ABSTRACT

A transferring device includes controllable goods carrier conveying goods to a target area, a stereo camera for providing images of the target area and a control system for deriving information from the images and controlling the goods carrier taking into account the information derived from the images. The stereo camera has two objective lenses and defines a common base line with a tilt angle relative to a horizontal. The common base line is placed in a vertical plane. The transferring device also includes floodlight projectors that are placed at a distance of at least 0.5 m from the stereo camera. Preferably, the controllable goods carrier is an ejecting spout.

8 Claims, 2 Drawing Sheets

TRANSFERRING DEVICE AND AN AGRICULTURAL VEHICLE

Figure 4:
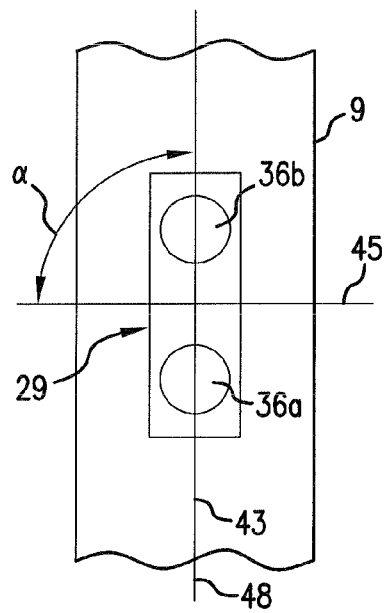

The present invention relates to a transferring device comprising a controllable goods carrier for conveying goods to a target area, an imaging device for providing images of the target area and a control system for deriving information from the images and controlling the goods carrier taking into account the information derived from the images.

Within agriculture attempts have been made during the recent years to automate transferring processes such as transferring harvested material from a harvester to a transport container on a wagon or a lorry. In these attempts use of a camera have been made or suggested for assisting the controlling of the goods carrier, such as an ejecting spout.

DE 44 26 059 A1 discloses a harvester with an ejecting spout for ejecting harvested material into a crop-carrying container of a transport wagon. A camera is attached to the lower side of the spout at a distance from its ejecting end. The camera provides an image of the end of the spout and the open top of the crop-carrying container, said image being transferred to a monitor in the driver's cabin. It is further suggested that image processing is used to provide control of the spout to maintain it aimed at the open top of the crop-carrying container in order to automatically ensure that the ejected crop will always hit its target: the open top of the crop-carrying container, A laser or a spotlight is mounted at the ejecting end of the spout to mark a point in the crop-carrying container indicating when the aim of the spout is correct. It is further suggested to provide for working at night by providing a light projector next to the camera and directed parallel therewith.

EP 1 344 445 A1, discloses a harvester with an ejecting spout with a hood for directing material ejected from the spout. A camera is attached to the hood and thus the camera will always have its direction of view parallel to the direction of ejecting of the spout. It is suggested to use two cameras and to stitch together to images provided thereby thus providing a larger field of view. In the alternative only one camera may be used at a time, namely the camera providing the best image.

A patent application, not yet published, filed by the present applicant suggests the use of a stereo camera for assisting the control of the spout of a harvester.

U.S. Pat. No. 6,247,538 B1 discloses an automatic excavator provided with a stereo camera comprising two cameras providing stereo images of the site in front of the excavator.

The object of the present invention is to enhance the quality of image assisted transferring of material from a goods carrier to a target area.

In a first aspect of the present invention this object is achieved in that the imaging device is a stereo camera comprising at least two objective lenses, said two objective lenses being positioned at a common base line, and that the base line is situated relative to the horizontal in a tilted manner.

The present inventors have realised that hereby good quality disparity images are obtainable e.g. when the target area is an open top of a container delimited by side walls, of which the one closest to the transferring device has an upper edge extending horizontally and perpendicularly to a direction of view of the camera. Disparity images pro vide depth information thus enhancing the suitability of the images for control purpose.

Preferably said two objective lenses have respective axes of view extending in respective directions of view, a mean of the axes of view of said two objective lenses defining a view axis of the stereo camera, and a line perpendicular to said view axis of the stereo camera at a midpoint between the two objective lenses and intersecting the respective axes of view of the two objective lenses defining said base line of the stereo camera, and that the base line of the stereo camera in a plane perpendicular to said view axis of the stereo camera has a tilt angle relative to horizontal, said tilt angle being preferably more than 15°.

Preferably the axes of view of said two objective lenses are positioned in a common plane. This facilitates the processing of the images by the control system.

The tilt angle is preferably more than 30°, and further preferably more than 45°. The greater tilt angle provides for good quality disparity images e.g. when the target area is delimited by an upper edge extending in another direction than horizontal and perpendicular to the direction of view of den camera.

Preferably the base line is situated in a vertical plane. This provides for symmetry in the change of perspective when the camera alternately views e.g. an upper edge delimiting a target area obliquely from one side and another. The symmetry facilitates the processing of the images making programming easier.

In a second aspect of the present invention a transferring device comprises a floodlight projector for illuminating the target area, said floodlight projector having a field angle of at least 10°, preferably at least 20°, and being positioned at least 0.5 meter, preferably at least 0.75 meter, and more preferably at least 1 meter from the imaging device. Providing a floodlight projector illuminating the target area provides for working at night. However the present inventors have realised that care should be taken not illuminate the area immediately in front of the imaging device because reflections from dust and debris in the air may provide noise in the images. This problem is solved in the second aspect of the present invention.

Preferably a second floodlight projector is provided for illuminating an area adjacent the target area, said second floodlight projector having a field angle of at least 10°, preferably at least 20°, and being positioned at least 0.5 meter, preferably at least 0.75 meter, and more preferably at least 1 meter from the imaging device. By illuminating an area adjacent the target area the target are becomes more readily recognisable by the control system. By placing the second floodlight projector at a distance from the camera it is avoided that this second projector illuminates the area immediately in front of the imaging device.

Preferably the distance between the light-beams of the floodlight projector(s) within the(their) field angle(s) and the imaging device is at least 0.5 meter, preferably at least 0.75 meter, and more preferably at least 1 meter. Thus it is further avoided to illuminate the area immediately in front of the imaging device.

Preferably any floodlight projector directing light towards the target and its vicinity is positioned at a distance of at least 0.5 meter, preferably at least 0.75 meter, and more preferably at least 1 meter from the imaging device.

In a preferred embodiment the first floodlight projector is located at a higher level than the imaging device and the second floodlight projector is located at a lower level than the imaging device. Hereby the first floodlight projector may illuminate the open top of a container while the second floodlight projector illuminates the side of the container facing the imaging device, thus providing for good quality images of the target area and part of its vicinity.

Preferably, when the goods carrier is elongate and has an outer end from which end it is able to transfer goods to the target area, the first floodlight projector, and the second floodlight projector if present, is attached to the goods carrier. This provides for the illumination following the movements of the goods carrier thus ensuring that the place whereto the gods carrier transfers the goods is kept illuminated, thus providing for identifying the target area when the goods carrier is aimed thereat.

Preferably the imaging device is a camera, preferably a stereo camera.

Generally according to the present invention the goods carrier is preferably elongate and has an outer end from which end it is able to transfer goods to the target area.

Generally the goods carrier is preferably selected from a group comprising: an ejecting spout, a running conveyor, an excavator bucket, a loading shovel, a fork, a catcher and a claw. The present inventors have realised that the principles of their invention are applicable in other agricultural fields than ejecting spouts of harvesters e.g. conveyors for potatoes, beets, front loading tractors and other loading vehicles. Further the present inventors have realised that the principles of their invention are applicable even in technical fields remote from agriculture e.g. contractor's machinery and excavators.

Preferably the transferring device is mounted on a vehicle, e.g. an agricultural vehicle.

Preferably the imaging device is attached to the goods carrier. Thus the imaging device will automatically follow the goods carrier for identification of the target area and for controlling the aiming of goods carrier thereat.

The invention also relates to a vehicle, preferably an agricultural vehicle, comprising a transferring device of the invention.

It should be noted that a stereo camera is a camera or camera system comprising two objective lenses providing two images from different viewpoints enabling the provision of a disparity image, i.e. an image containing depth information, by means of image processing equipment, such as a computer with a suitable program.

Further it should be noted that the field angle of a floodlight projector is the angle of the beam where it reaches at least 10% of the intensity of the centre of the beam.

A floodlight projector should be understood as a projector with a relatively large field angle, thus providing for illuminating an area, opposed to spotlights, which has narrow field angles providing for illuminating a small spot.

Figure 1:
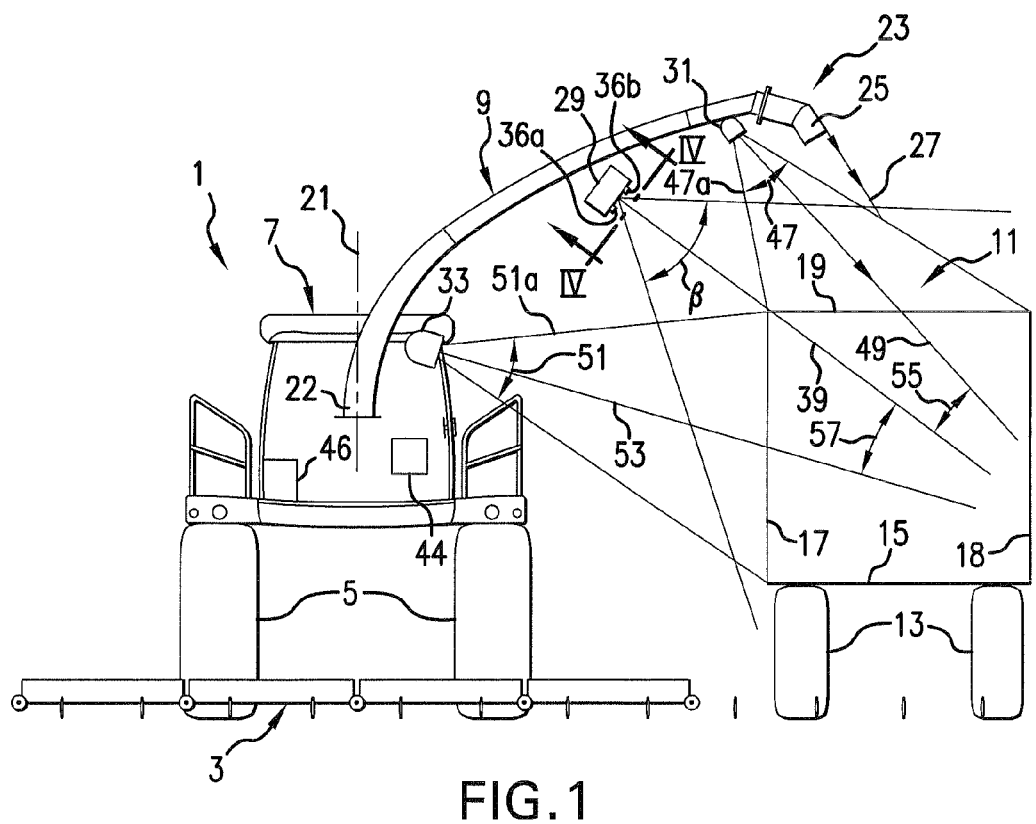
Figure 2:
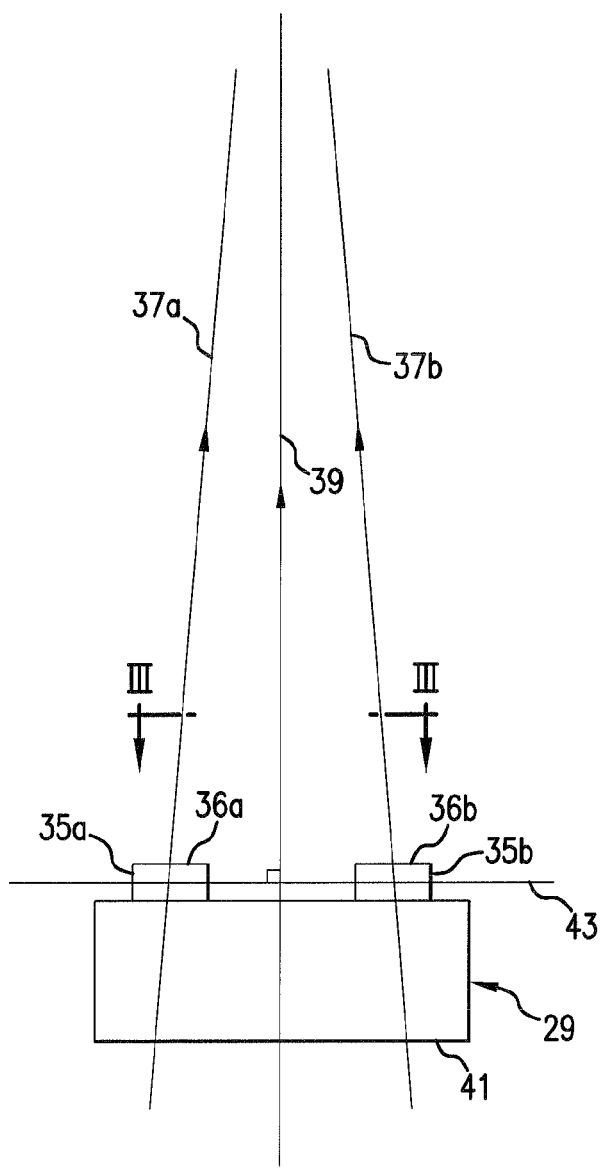
Figure 3:
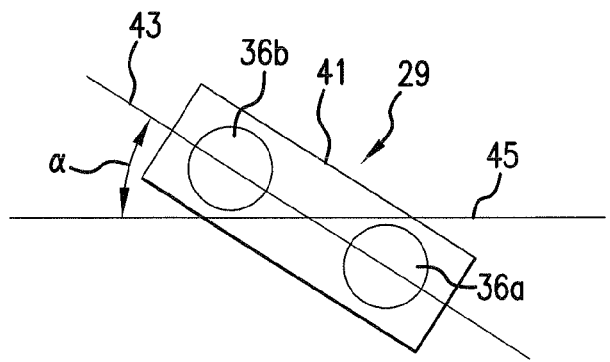

In the following the invention will be explained in more detail by means of examples of embodiments with reference to the schematic drawings, wherein FIG. 1 shows a forage harvester and transport wagon, FIG. 2 shows a plan view of a stereo camera, FIG. 3 shows a view as indicated by line in FIG. 2, and FIG. 4 shows a view as indicated by line IV-IV in FIG. 1.

FIG. 1 shows in a front view a forage harvester 1 with a header 3, ground wheels 5, a driver's cabin 7 and an ejecting spout 9. During work the header 3 will harvest a crop, which is processed by the harvester and ejected from the spout 9. To collect the ejected crop a transport wagon 11 is driven alongside the forage harvester 1. Of the transport wagon 11 only ground wheels 13 and a crop-carrying container with a bottom 15, sidewalls 17, 18 and an open top 19, is shown.

The spout 9 is in a manner known per se mounted on the harvester to be rotated in a controlled manner around a vertical axis 21 by means of actuators indicated by numeral 22. The spout is elongated and has an outer end 23 provided with an adjustable hood 25 for directing a crop stream 27 ejected from the spout 9.

As described so far the forage harvester 1, the transport wagon 11 and theft way of operation correspond or may correspond to prior art.

As a novel feature a stereo camera 29 is mounted on the spout 9 on the lower side thereof and at a distance from the outer end 23. Further two floodlight projectors are mounted on the spout 9. Thus a first floodlight projector 31 is mounted at the outer end 23 of the spout and a second floodlight projector 33 is mounted close to the opposite, inner end of the spout 9.

The stereo camera 29 is show in FIGS. 2 and 3 to explain its position as mounted. The stereo camera 29 comprises two cameras 35*a* and 35*b*, e.g. CCD cameras or video cameras, with objective lenses 36*a* and 36*b*, respectively, having respective directions of view 37*a* and 37*b*. A mean of the two directions of view defines a view direction 39 of the stereo camera 29. The two cameras 35*a* and 35*b* are accommodated in a common housing 41. In the present embodiment the two directions of view 37*a* and 37*b* converge towards a point of focus, not shown. The two directions of view 37*a* and 37*b* and the centres of the two objective lenses 36*a*, 36*b* define a view plane of the stereo camera 29. A line, which is perpendicular to the view direction 39 and is lying in the view plane, defines a base 43 of the stereo camera 29.

As shown in FIG. 2 the stereo camera 29 has its base 43 lifted relative to the horizontal 45 by a tilt angle α, which is preferably at least 30°. Thereby the two objective lenses 36*a* and 36*h* are positioned at different levels, the lens 36*a* being positioned at a lower level and the lens 36*b* being positioned at a higher level.

In the embodiment shown in FIG. 1 the stereo camera 29 is, as seen in FIG. 4, mounted with a tilt angle α of 90°, i.e. the base of the stereo camera 29 is placed in a vertical plane 48, which provides for symmetry in the change of perspective when the spout is rotated and the stereo camera 29 "sees" the upper edge of the sidewall 17 alternate from one obliquely position to another, which entails advantages relative to image processing. The stereo camera is preferably a wide-angle camera with a large viewing angle β allowing the camera to "see" simultaneously the open top 19 and the nearest sidewall 17 of the crop-carrying container of the transport wagon 11 as indicated in FIG. 1.

Thus the provision of the stereo camera provides for obtaining monochrome (or even colour) images as well as disparity images of the crop-carrying container. The monochrome images may e.g, be transfer to a monitor 44 in the driver's cabin to enable or help the driver monitoring the process of transferring crop to the transport wagon as it is known per se, while the disparity image is suited as an input for automatic or semi-automatic control.

Thus the forage harvester 1 comprises a control system 46, which receives images from the stereo camera 29, process the images to determine whether the spout aims the crop stream 27 correctly at the target area, i.e. the open top 19 of the crop-carrying container, and, if needed, provides control signals for the actuators 22 of the spout 9 to adjust the position of the latter, so that the target area is placed correctly in the viewing field of the stereo camera 29 and/or so that the crop stream 27 hit the target area correctly in a position, which may be predetermined or which may be continuously updated depending on the filling of the container.

Because the base 43 of the stereo camera 29 is placed at an angle, which in the embodiment is close to 90°, relative to the upper edge of the sidewall 17, the stereo camera 29 is able to provide disparity images with only little noise of the area near said upper edge.

Generally noise-less images provide for good quality of the control process.

The two floodlight projectors are arranged as follows.

The first floodlight projector 31 has a field angle 47 and a mean direction of illumination 49, and the second floodlight projector 33 has a field angle 51 and a mean direction of illumination 53. In the following the light-beams of the respective floodlight projectors 31 and 33 within their respective field angles will be designated "the beams" 47a and 51a, respectively.

The first floodlight projector 31 is positioned at the outer end 23 of the spout and has its mean direction of illumination 49 directed at the open top 19 of the crop-carrying container, which is the target area for crop stream 27 ejected from the spout 9. As the stereo camera 29 is mounted at a distance from the outer end 23, a distance is provided between the first floodlight projector 31 and the stereo camera 29 of approximately 1 meter. The distance, i.e. the smallest distance, between the beam 47a of the first floodlight projector 31 and the stereo camera 29 is slightly less than 1 meter.

The second floodlight projector 33 is placed on the other side of the stereo camera 29 compared to the first floodlight projector at a larger distance from the stereo camera 29. As it is seem i FIG. 1 the second floodlight projector 33 is placed at a somewhat retracted position for which reason the distance between its beam 51a and the stereo camera 29 is distinctively smaller than the distance between the stereo camera and the second floodlight projector proper. Still the latter distance is approximately 1 meter.

The angle 55 between the mean direction of illumination 49 of the first floodlight projector 31 and the view direction of the stereo camera 29, and the angle 57 between the mean direction of illumination 53 of the second floodlight projector 33 and the view direction of the stereo camera 29, are both less that 25°. These relatively small angles provide for good illumination of the field and items viewed by the stereo camera 29 thus providing for good images.

Due to the distances between on one hand the stereo camera and on the other hand the floodlight projectors and their beam the area immediately in front of the stereo camera is not illuminated and thus dust and debris that are flowing in the air are not illuminated in this area. Therefore such dust and debris provide only little noise to the images obtained by the stereo camera. In this connection especially the distances between the stereo camera and the floodlight projectors are important because the intensity of the light is larger close to the floodlight projectors than farther away from them.

Although the principles of the invention in the above have been illustrated by means of an example it should be understood that the scope of the invention, as defined in the claims, is not restricted to such example.

The invention claimed is:

1. A transferring device comprising:
   a controllable goods carrier (9) for conveying goods to a target area (19);
   an imaging device (29) for providing images of the target area, the imaging device (29) comprising two objective lenses (36a, 36b) positioned at a common base line (43) in a vertical plane and situated relative to a horizontal (45) in a tilted manner; and
   a control system (46) for deriving information from the target area images and controlling the controllable goods carrier (9) in accordance with the derived information.

2. The transferring device according to claim 1,
   wherein the two objective lenses (36a, 36b) have respective axes of view (37a, 37b) extending in respective directions of view,
   wherein a mean of the axes of view (37a, 37b) defines a view axis (39) of the stereo camera,
   wherein a line perpendicular to the view axis (39) at a midpoint between the two objective lenses (36a, 36b) and intersecting the respective axes of view (37a, 37b) defines the common base line (43) of the stereo camera, and
   wherein the common base line (43) in a plane perpendicular to the view axis (39) has a tilt angle ($\alpha$) relative to horizontal (45) of greater than 15°.

3. The transferring device according to claim 2, wherein the tilt angle ($\alpha$) relative to horizontal (45) lies in a range extending between 30° and 45°.

4. The transferring device according to claim 1, wherein the respective axes of view (37a, 37b) of view are positioned in a common plane.

5. The transferring device according to claim 1, wherein the controllable goods carrier (9) is elongate and is configured with an outer end (23) from which the goods are conveyed to the target area.

6. The transferring device according to claim 1, wherein the transferring device is mounted on a vehicle (1) utilized in the at least one of the harvesting and transfer of agricultural material.

7. The transferring device according to claim 1, wherein the imaging device (29) is attached to the controllable goods carrier (9).

8. A forage harvester (1) comprising a transferring device according to claim 1.

* * * * *